United States Patent
Takizawa

(10) Patent No.: US 10,913,162 B2
(45) Date of Patent: *Feb. 9, 2021

(54) ROBOT SYSTEM AND CONTROL METHOD OF ROBOT

(71) Applicant: OMRON Corporation, Kyoto (JP)

(72) Inventor: Kazuhiro Takizawa, Kyoto (JP)

(73) Assignee: OMRON Corporation, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/276,547

(22) Filed: Feb. 14, 2019

(65) Prior Publication Data
US 2019/0283258 A1    Sep. 19, 2019

(30) Foreign Application Priority Data
Mar. 15, 2018   (JP) .................. 2018-048503

(51) Int. Cl.
B25J 11/00       (2006.01)
B05B 12/08       (2006.01)
(Continued)

(52) U.S. Cl.
CPC ......... *B25J 11/0075* (2013.01); *B05B 12/084* (2013.01); *B05B 12/124* (2013.01); *B05B 13/0431* (2013.01); *B05C 11/1005* (2013.01); *B25J 9/1694* (2013.01); *B25J 13/087* (2013.01); *B25J 13/089* (2013.01); *B25J 19/02* (2013.01)

(58) Field of Classification Search
USPC ......... 118/323, 321, 712, 713, 679–682, 665
See application file for complete search history.

(56) References Cited

U.S. PATENT DOCUMENTS

2017/0252765 A1*   9/2017   Medard ................ B05D 7/14

FOREIGN PATENT DOCUMENTS

DE          3320160       12/1984
DE       102014116830      5/2016
(Continued)

OTHER PUBLICATIONS

English Translation Description DE102014116830 May 19, 2016 (Year: 2016).*
(Continued)

*Primary Examiner* — Yewebdar T Tadesse
(74) *Attorney, Agent, or Firm* — JCIPRNET

(57) ABSTRACT

A robot system and a control method of a robot are provided. The robot system includes a robot, a liquid application part being provided on the robot, an application thickness measurement part measuring an application thickness of a liquid applied by the liquid application part, a distance measurement part measuring a first distance from the distance measurement part to an application object, a control part controlling the robot based on the first distance so that a second distance from the liquid application part to the application object becomes constant, a supply amount adjustment part adjusting a supply amount of the liquid to the application object according to the application thickness measured by the application thickness measurement part, wherein the distance measurement part, the liquid application part and the application thickness measurement part are arranged in this order in an application direction of the liquid.

5 Claims, 7 Drawing Sheets

(51) Int. Cl.
*B05B 12/12* (2006.01)
*B05B 13/04* (2006.01)
*B05C 11/10* (2006.01)
*B25J 9/16* (2006.01)
*B25J 13/08* (2006.01)
*B25J 19/02* (2006.01)

(56) References Cited

FOREIGN PATENT DOCUMENTS

| | | | | |
|---|---|---|---|---|
| DE | 102017208102 A1 | * | 11/2018 | ............... B05D 3/12 |
| JP | 11197588 A | * | 7/1999 | |
| JP | 2004298697 | | 10/2004 | |
| JP | 2010042325 | | 2/2010 | |
| WO | 2005018813 | | 3/2005 | |
| WO | 2009118072 | | 10/2009 | |

OTHER PUBLICATIONS

"Search Report of Europe Counterpart Application", dated Jul. 15, 2019, pp. 1-10.

* cited by examiner

ROBOT SYSTEM AND CONTROL METHOD OF ROBOT

CROSS-REFERENCE TO RELATED APPLICATION

This application claims the priority benefit of Japan Application No. 2018-048503, filed on Mar. 15, 2018. The entirety of the above-mentioned patent application is hereby incorporated by reference herein and made a part of this specification.

BACKGROUND

Technical Field

The disclosure relates to a robot system and a control method of a robot.

Related Art

Patent Document 1 discloses a technique of attaching a die head to an actuator that moves up and down, measuring a distance between the die head and a surface of a substrate by a distance measuring sensor provided on the die head, and maintaining the distance between the die head and the surface of the substrate at a set distance. According to Patent Document 1, a uniform coating film is formed on the substrate in accordance with undulation of the substrate.

Patent Document 2 discloses a technique of setting a position of a chemical solution nozzle relative to a base according to viscosity of a solution. According to Patent Document 2, a high-viscosity solution is applied to a surface of the base with a uniform film thickness.

PATENT DOCUMENTS

[Patent Document 1] Japanese Laid-open No. 2004-298697
[Patent Document 2] Japanese Laid-open No. 2010-042325

However, if a robot is used to apply a liquid to a substrate or the like, an application thickness of the liquid is affected by not only the undulation of the substrate but also ambient temperature, remaining amount of the liquid in a liquid application part, or pressure inside the liquid application part and so on. In this regard, in the techniques described in Patent Documents 1 and 2, an application amount of the liquid cannot be controlled in real time in accordance with a change in the ambient temperature and so on, and the liquid cannot be applied with a uniform layer thickness.

Therefore, the disclosure provides a robot system and a control method of a robot capable of applying a liquid with a uniform layer thickness even if there is a change in conditions such as ambient temperature and so on.

SUMMARY

A robot system of the disclosure includes:
a robot;
a liquid application part provided on the robot;
an application thickness measurement part measuring an application thickness of a liquid applied by the liquid application part;
a distance measurement part measuring a first distance from the distance measurement part to an application object;
a control part controlling the robot based on the first distance so that a second distance from the liquid application part to the application object becomes constant; and
a supply amount adjustment part adjusting a supply amount of the liquid to the application object according to the application thickness measured by the application thickness measurement part, wherein
the distance measurement part, the liquid application part and the application thickness measurement part are arranged in this order in an application direction of the liquid.

A control method of a robot of the disclosure includes following steps:
measuring an application thickness of a liquid applied by a liquid application part provided on the robot;
measuring a first distance from a distance measurement part to an application object;
controlling the robot based on the first distance so that a second distance from the liquid application part to the application object becomes constant; and
adjusting a supply amount of the liquid to the application object according to the measured application thickness, wherein
processing is performed in an order of the step of measuring the distance to the application object, the step of applying the liquid by the liquid application part and the step of measuring the application thickness.

DESCRIPTION OF THE EMBODIMENTS

Figure 1:
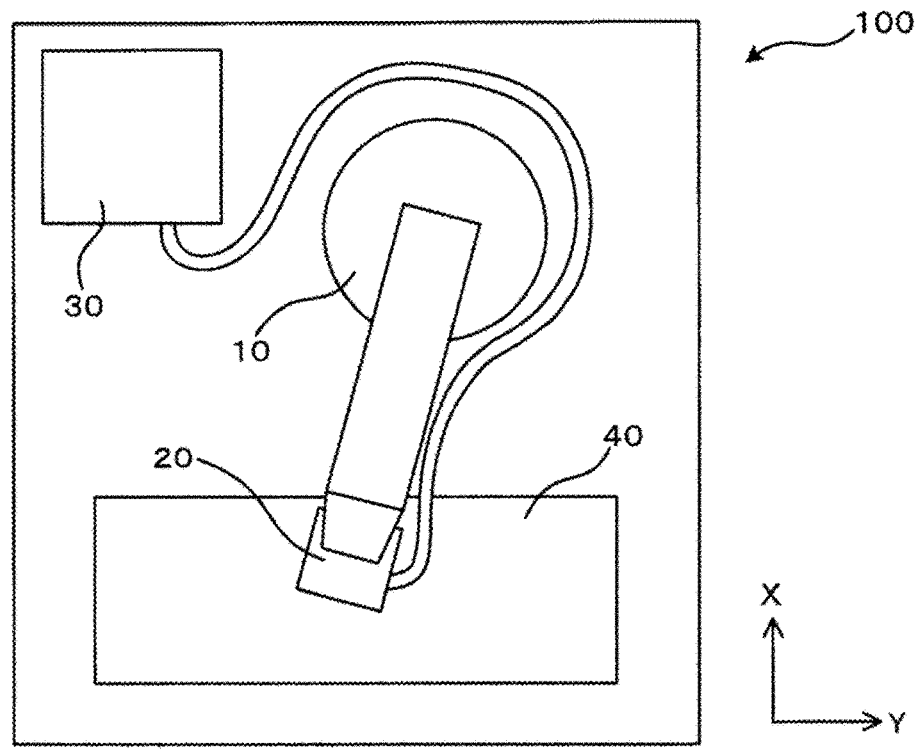
FIG. 1 is a top view showing a robot system in an embodiment.

Hereinafter, embodiments of the disclosure are explained in detail with reference to the drawings.
(Robot System)
FIG. 1 is a top view showing a robot system 100 in an embodiment of the present disclosure. As shown in FIG. 1, the robot system 100 in the present embodiment includes a robot 10, a dispenser head 20, a dispenser controller 30 as a control device of the robot 10, and a workpiece 40 as an application object.

The robot 10 is, for example, an arm type six-axis articulated robot. The arm type six-axis articulated robot includes a power source such as a servomotor or the like, wherein the servomotor is driven by a control signal output from the dispenser controller 30 based on a robot control program and each joint axis is operated.

The dispenser head 20 applies a liquid to the workpiece 40. As the liquid, a low- to medium-viscosity liquid such as a sealer material, water-based printing ink, engine oil, olive oil or the like, for example, may be used.

Figure 2:
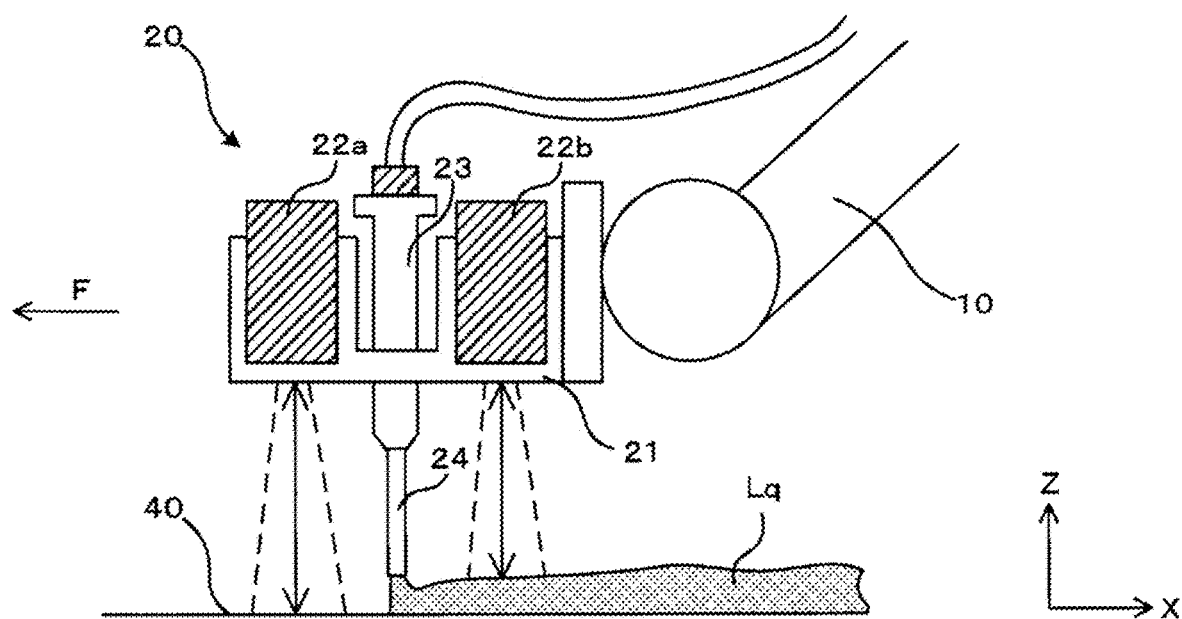
FIG. 2 is a side view showing a configuration of a dispenser head.

FIG. 2 is a side view showing a configuration of the dispenser head 20. As shown in FIG. 2, the dispenser head 20 includes a holder 21, a distance measuring sensor 22a, an application thickness measuring sensor 22b, a syringe 23, and a nozzle 24 as a liquid application part. The holder 21 holds the distance measuring sensor 22a, the application thickness measuring sensor 22b and the syringe 23.

The distance measuring sensor 22a is a sensor for measuring a first distance from the distance measuring sensor 22a to the workpiece 40. As an example, a reflective sensor may be used. The application thickness measuring sensor 22b is a sensor for detecting an application thickness d of the liquid applied to the workpiece 40. As an example, a reflective sensor may be used.

The syringe 23 is a container containing the liquid to be applied. The nozzle 24 is a tube attached to a tip of the syringe 23 and discharging the liquid.

As shown in FIG. 2, the distance measuring sensor 22a, the nozzle 24 and the application thickness measuring sensor 22b are arranged in this order in an application direction of the liquid as shown by an arrow F.

Figure 3:
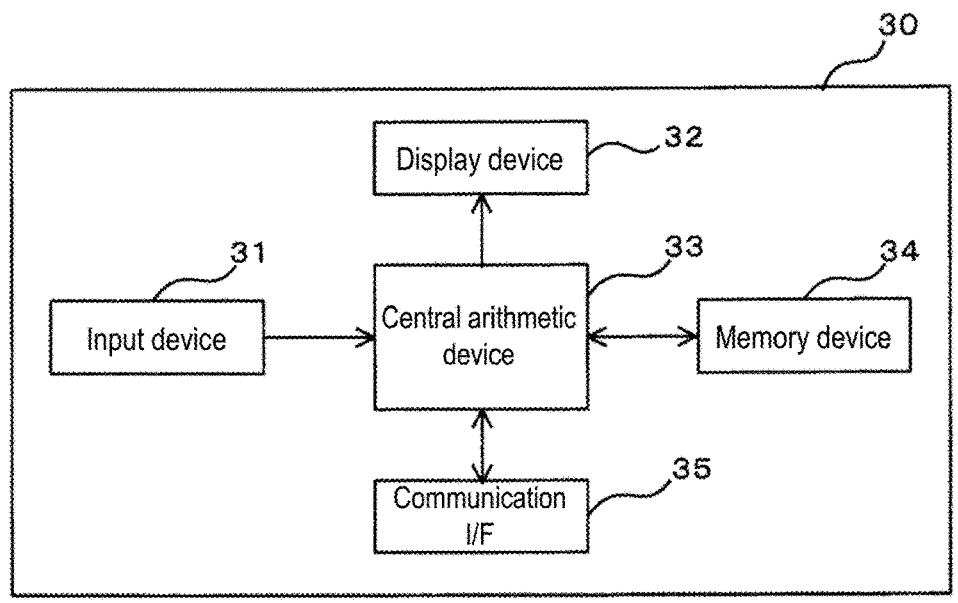
FIG. 3 is a block diagram showing hardware configuration of a dispenser controller.

The dispenser controller 30 is a control device controlling the robot 10 to keep a constant distance between the nozzle 24 and the workpiece 40 and to adjust an application amount of the liquid. FIG. 3 shows hardware configuration of the dispenser controller 30. As shown in FIG. 3, the dispenser controller 30 includes an input device 31, a display device 32, a central arithmetic device 33, a memory device 34 and a communication interface (I/F) 35. As an example, the input device 31 is composed of a keyboard and so on. As an example, the display device 32 is composed of a display. As an example, the central arithmetic device 33 is composed of a central processing unit (CPU). The memory device 34 includes a nonvolatile memory device and a volatile memory device, wherein the nonvolatile memory device stores the robot control program and a sequence control program and so on. In addition, the volatile memory device is properly used as a work memory during execution of the central arithmetic device 33. The communication I/F 35 is, for example, an interface of a serial line such as RS232C or the like, and inputs an output value of the sensor 22 and communicates with the robot 10. The communication I/F 35 may also be an interface of other communication line.

Figure 4:
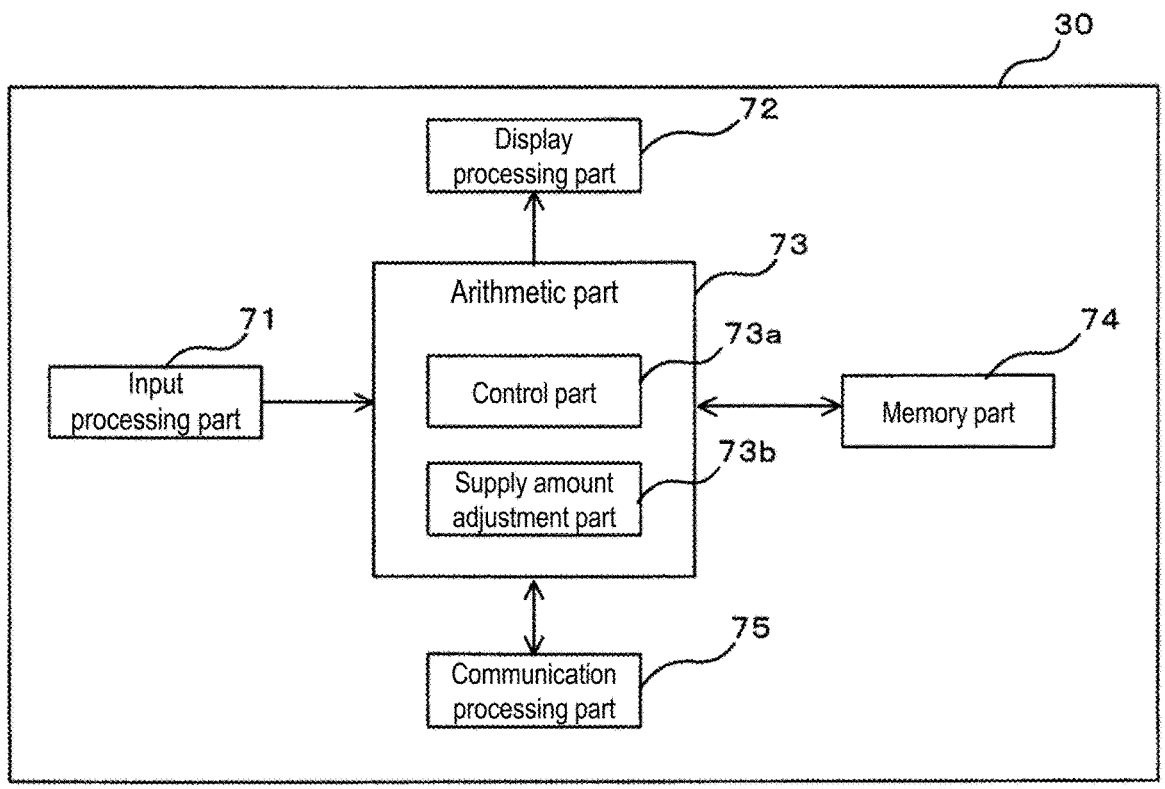
FIG. 4 is a functional block diagram of the dispenser controller.

FIG. 4 is a functional block diagram of the dispenser controller 30 in the present embodiment. The dispenser controller 30 functions as an input processing part 71, a display processing part 72, an arithmetic part 73, a memory part 74, and a communication processing part 75. The processing part 71 processes an input from the input device 31. The display processing part 72 creates display data to be output to the display device 32. The arithmetic part 73 includes a control part 73a and a supply amount adjustment part 73b. The control part 73a controls the robot 10 based on the above first distance so that a second distance from the nozzle 24 to the workpiece 40 becomes constant. The supply amount adjustment part 73b adjusts a supply amount of the liquid to the workpiece 40 according to an application thickness measured by the application thickness measuring sensor 22b. Details of functions of the control part 73a and the supply amount adjustment part 73b are described later.

The memory part 74 stores the robot control program and the sequence control program and so on.

(Control Method of Application Amount)

Figure 5:
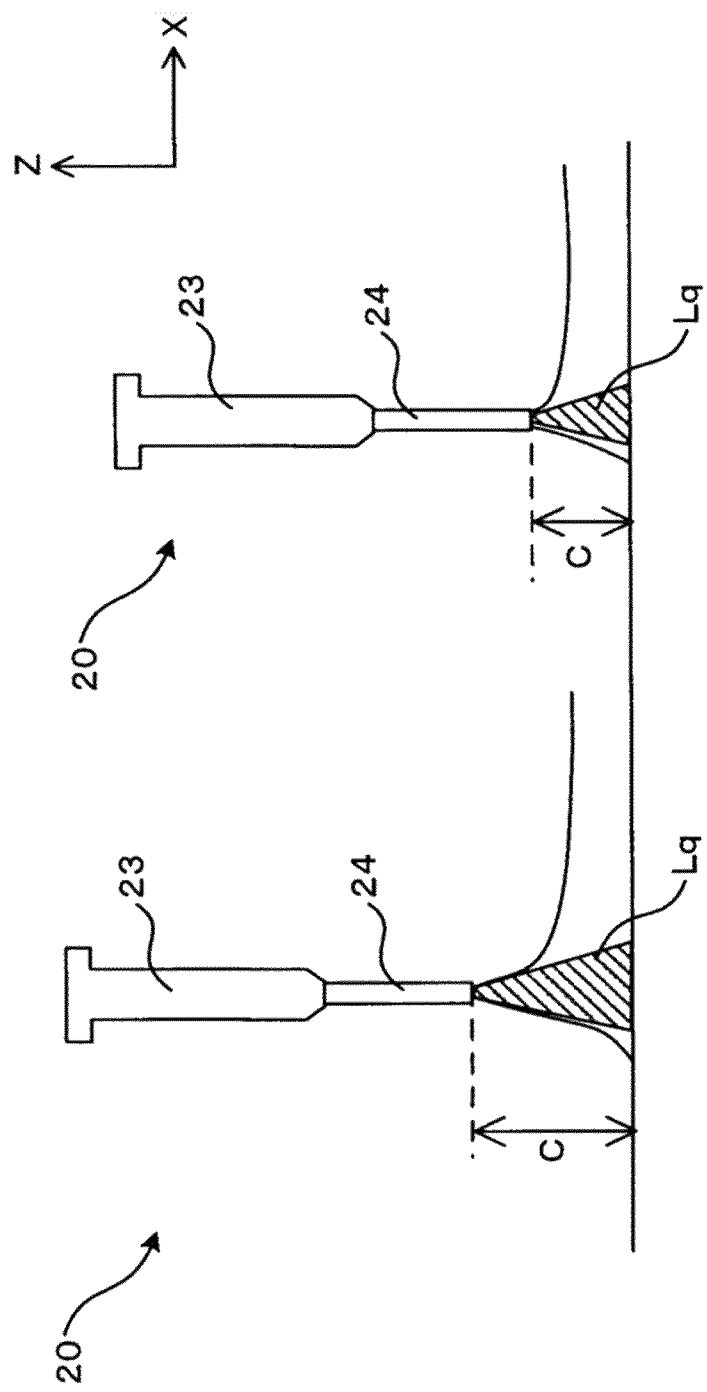
FIG. 5(A) illustrates a discharge of an application liquid in the case where a workpiece and a nozzle are far from each other.
FIG. 5(B) illustrates the discharge of the application liquid in the case where the workpiece and the nozzle are not as far from each other as they are in FIG. 5(A).
(A) and (B) of FIG. 6 are diagrams for explaining a control method of a distance between the nozzle and the workpiece.
(A) and (B) of FIG. 7 are diagrams for explaining an application thickness measurement method.

FIG. 5(A) and FIG. 5(B) are diagrams for illustrating an adjustment method of an application amount of an application liquid Lq to the workpiece 40 in the present embodiment. In the dispenser head 20, by creating negative pressure inside the syringe 23, it is suppressed that the application liquid Lq drops down due to gravity. By creating atmospheric pressure or positive pressure inside the syringe 23, the application liquid Lq is discharged.

At this moment, when a distance C between the workpiece 40 as the application object and the nozzle 24 is far as shown in FIG. 5(A), due to the gravity of the application liquid Lq coming out from the nozzle 24, a larger amount of application liquid Lq is discharged than in the case as shown in FIG. 5(B) where the distance C is not far. In the present embodiment, by utilizing this action, the robot 10 is controlled by the supply amount adjustment part 73b, and the application amount is adjusted by changing the distance between the workpiece 40 as the application object and the nozzle 24.

(Control Method of Distance Between Nozzle and Workpiece)

Next, a control method that keeps a constant distance between the nozzle 24 and the workpiece 40 in the robot system 100 of the present embodiment is explained. (A) and (B) of FIG. 6 are diagrams for explaining a control method of the distance between the nozzle and the workpiece in the present embodiment.

Figure 6:
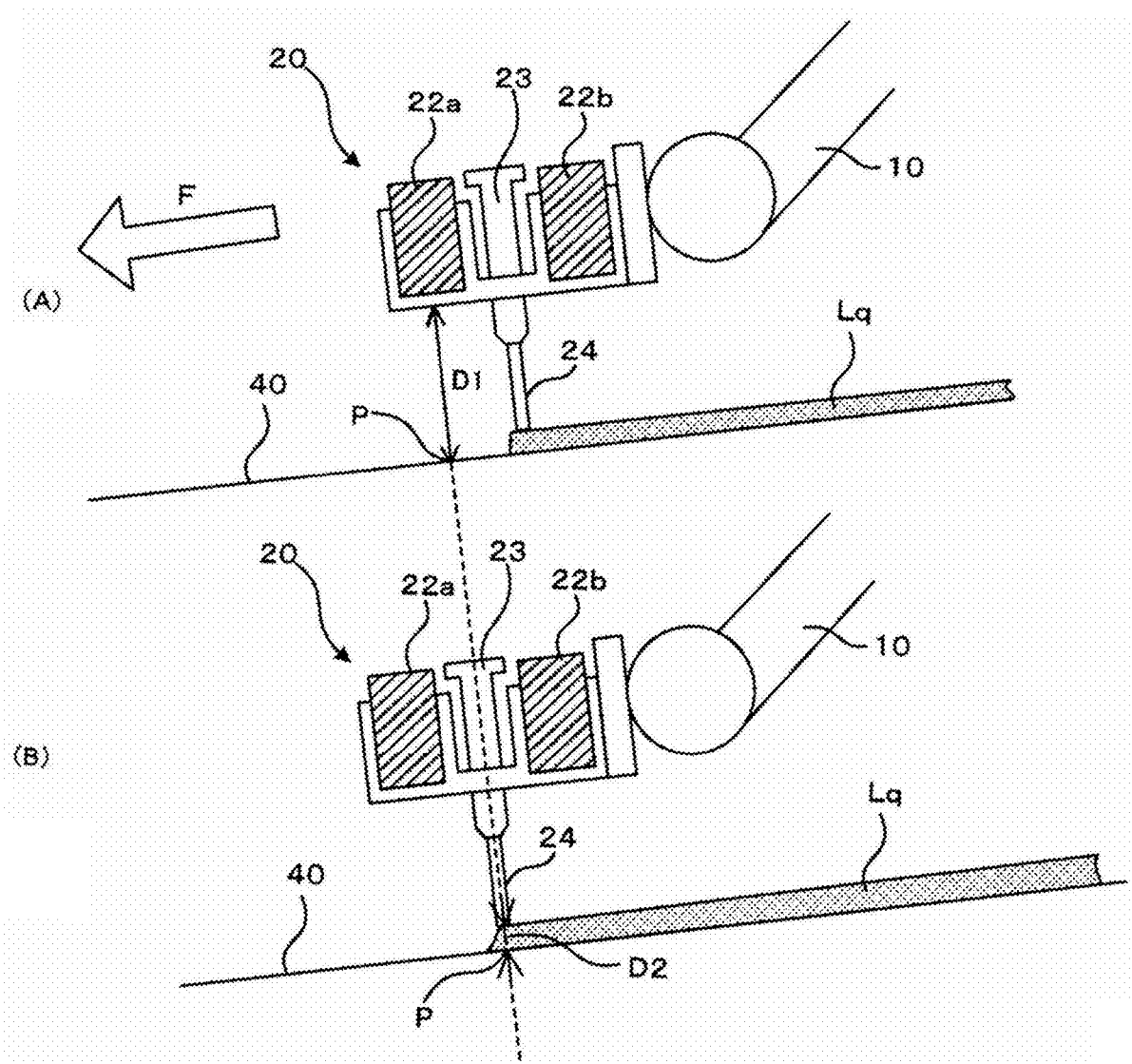

As shown in (A) of FIG. 6, by the distance measuring sensor 22a, the control part 73a measures a first distance D1 between the nozzle 24 and the workpiece 40 at a point P on the workpiece 40 at a certain moment. Then, the dispenser head 20 is moved in the application direction of the liquid as shown by the arrow F, and when the nozzle 24 arrives at the point P, as shown in (B) of FIG. 6, the control part 73a drives the dispenser head 20 based on the first distance D1 so that a second distance D2 between the nozzle 24 and the workpiece 40 becomes constant. Since a distance between the distance measuring sensor 22a and the nozzle 24 is known in advance, by previously measuring the first distance D1, when the nozzle 24 arrives at the point P, the second distance D2 between the nozzle 24 and the workpiece 40 can be kept constant. Accordingly, even if undulation occurs in a surface of the workpiece 40, the distance between the nozzle 24 and the workpiece 40 is kept constant and the application thickness can be made constant.

(Application Thickness Measurement Method)

Next, an application thickness measurement method in the robot system 100 of the present embodiment is explained. (A) and (B) of FIG. 7 are diagrams for explaining the application thickness measurement method in the present embodiment.

Figure 7:
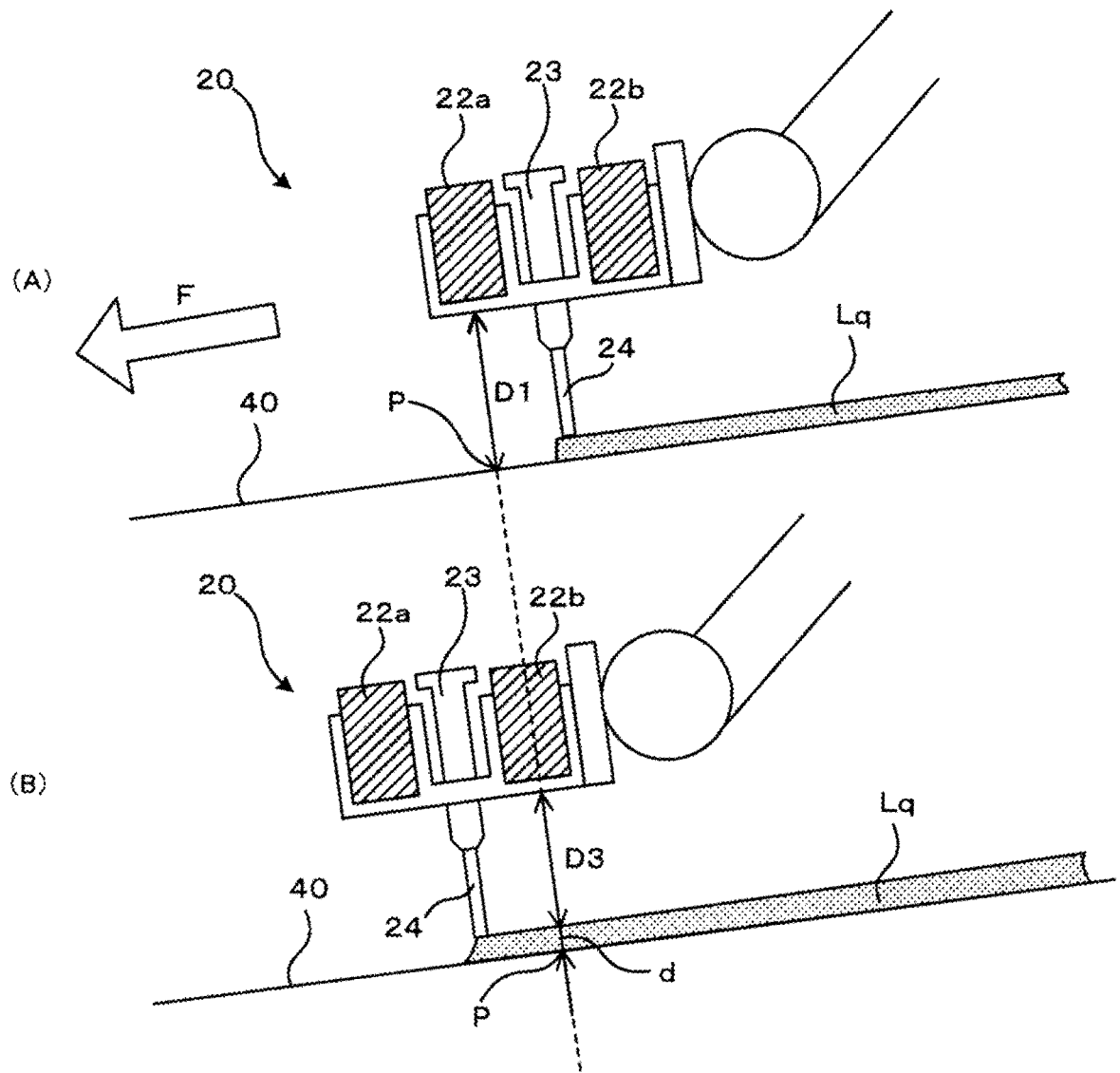

As shown in (A) of FIG. 7, by the distance measuring sensor 22a, the control part 73a measures the first distance D1 between the nozzle 24 and the workpiece 40 at the point P on the workpiece 40 at a certain moment. The control part 73a keeps constant the second distance D2 between the nozzle 24 and the workpiece 40 as described above. Next, the application thickness measuring sensor 22b measures the application thickness d by measuring a distance D3 from the application thickness measuring sensor 22b to an applied surface of the application liquid Lq, and subtracting the distance D3 from the above first distance D1. In this way, in the present embodiment, the application thickness of the liquid is measured by a time difference calculation using two sensors, namely, the distance measuring sensor 22a and the application thickness measuring sensor 22b.

Figure 8:
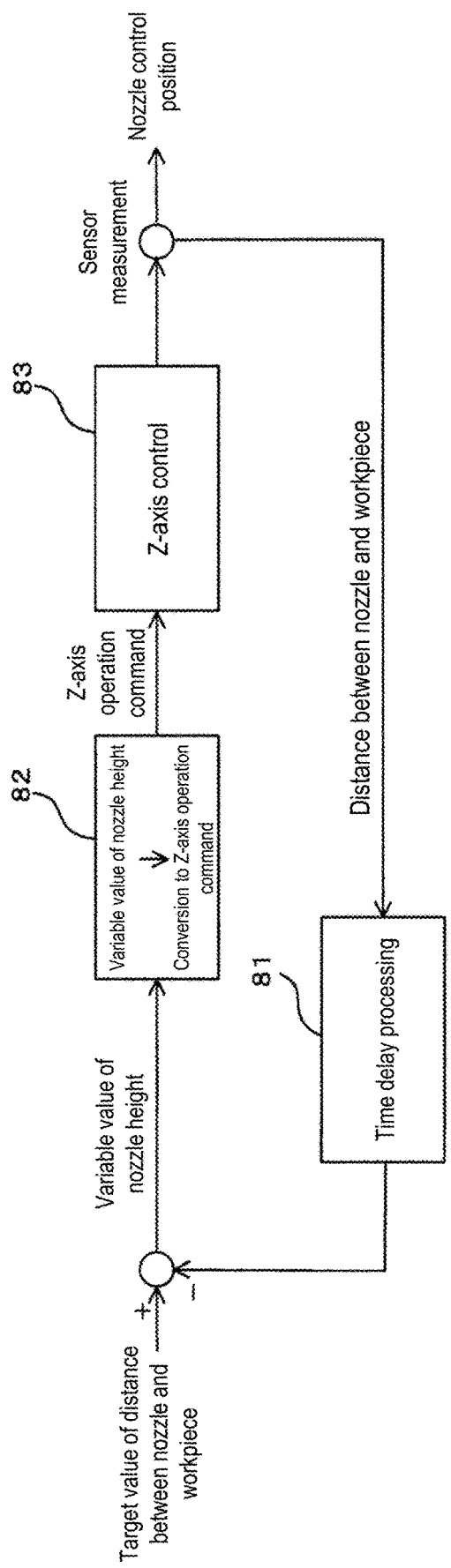
FIG. 8 is a block diagram showing a control loop of control of the distance between the nozzle and the workpiece.

Next, the control method of the distance between the nozzle and the workpiece, and the adjustment method of the application amount in the present embodiment are more specifically explained with reference to FIG. 8 and FIG. 9. FIG. 8 is a block diagram showing a control loop of control of the distance between the nozzle and the workpiece in the present embodiment. As shown in FIG. 8, the control part 73a of the dispenser controller 30 measures the first distance D1 between the distance measuring sensor 22a and the workpiece 40 by the distance measuring sensor 22a. Next, from the first distance D1 and the previously known distance between the distance measuring sensor 22a and the nozzle 24, the control part 73a calculates the second distance D2 between the nozzle 24 and the workpiece 40. Then, the control part 73a delays a feedback of the second distance D2 by a time delay processing function 81. A delay time is set to, for example, a period of time from a moment when the first distance D1 is measured at the point P to when the nozzle 24 arrives at the point P.

For the distance between the nozzle 24 and the workpiece 40, a target value is determined in advance. From this target value and the second distance D2 provided as delayed feedback, the control part 73a calculates a variable value of a height of the nozzle 24 relative to the target value. Next, the control part 73a inputs the variable value of the height of the nozzle 24 to a variable value-command conversion function 82. In the variable value-command conversion function 82, if the variable value of the height of the nozzle 24 is greater than the target value, a command to move the dispenser head 20 in a Z-axis minus direction (downward direction) is output. In the variable value-command conversion function 82, if the variable value of the height of the nozzle 24 is less than the target value, a command to move the dispenser head 20 in a Z-axis plus direction (upward direction) is output.

An operation command in the Z-axis direction that is output from the variable value-command conversion function 82 is input to a Z-axis control function 83. The Z-axis control function 83 moves the dispenser head 20 according to the input operation command. In the present embodiment, by the control loop as above, the distance between the nozzle 24 and the workpiece 40 is kept constant.

Next, an application thickness control method in the present embodiment is more specifically explained with reference to FIG. 9. FIG. 9 is a block diagram showing a control loop of Z-axis (vertical direction) control of the dispenser head 20 in the present embodiment. As shown in FIG. 9, the control part 73a of the dispenser controller 30 measures the above first distance D1 by the distance measuring sensor 22a.

Then, the control part 73a delays a feedback of the first distance D1 by a time delay processing function 90. A delay time is set to, for example, a period of time from a moment when the first distance D1 is measured at the point P to when the application thickness measuring sensor 22b arrives at the point P.

Meanwhile, when the application thickness measuring sensor 22b arrives at the point P, the application thickness measuring sensor 22b measures the distance D3 from the application thickness measuring sensor 22b to the applied surface. Then, by subtracting the distance D3 from the first distance D1 provided as delayed feedback as described above, the application thickness d is calculated.

Next, the supply amount adjustment part 73b converts the application thickness d into an application liquid capacity by a height-capacity conversion function 91. As a result, since a current value of the application liquid capacity is known, the supply amount adjustment part 73b returns the current value as feedback.

When the application liquid Lq is applied, a target value of the application liquid capacity is determined in advance. From the target value of the application liquid capacity and the feedback of the current value of the application liquid capacity, the supply amount adjustment part 73b calculates a variable value relative to the target value of the application liquid capacity. Next, the supply amount adjustment part 73b inputs the variable value of the application liquid capacity to a variable value-command conversion function 92. In the variable value-command conversion function 92, if the variable value of the application liquid capacity is greater than the target value of the application liquid capacity, i.e., if the application amount is large, a command to move the dispenser head 20 in the Z-axis minus direction (downward direction) is output. In the variable value-command conversion function 92, if the variable value of the application liquid capacity is smaller than the target value of the application liquid capacity, i.e., if the application amount is small, a command to move the dispenser head 20 in the Z-axis plus direction (upward direction) is output.

An operation command in the Z-axis direction that is output from the variable value-command conversion function 92 is input to a Z-axis control function 93. The Z-axis control function 93 moves the dispenser head 20 according to the input operation command. In the present embodiment, by the control loop as above, the application amount is controlled.

Figure 9:
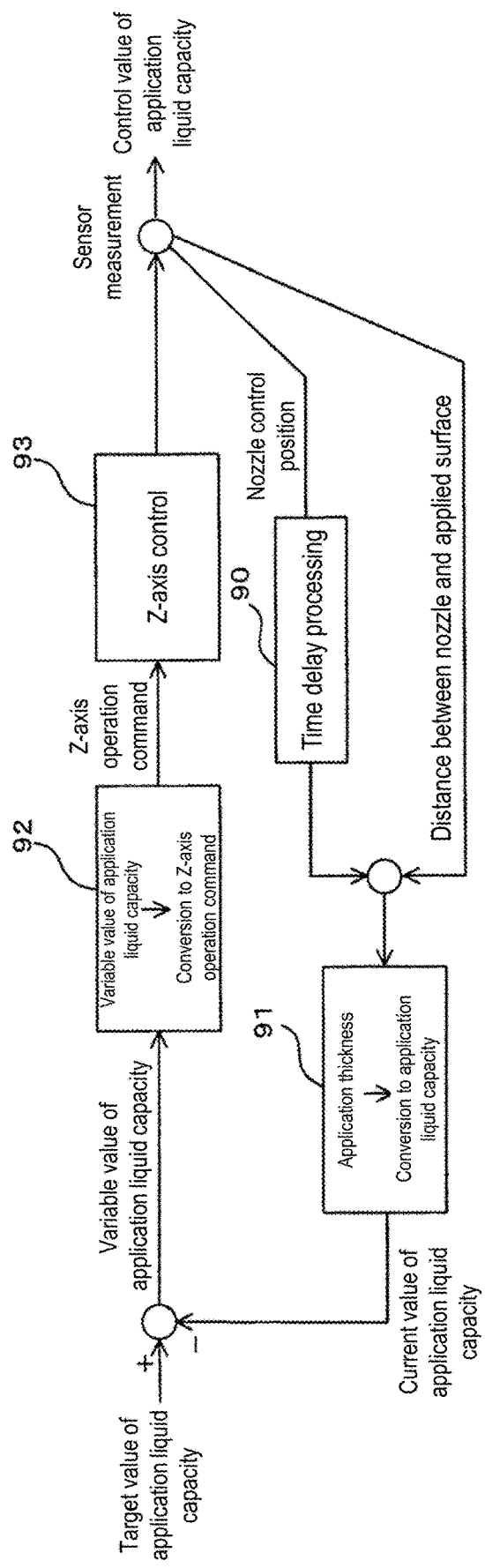
FIG. 9 is a block diagram showing a control loop of Z-axis (vertical direction) control of the dispenser head.

In the present embodiment, by performing the control of the distance between the nozzle and the workpiece as shown in FIG. 8 and the application thickness control as shown in FIG. 9 in parallel, while the distance between the nozzle and the workpiece is kept constant, the dispenser head 20 is linearly controlled to move in the Z-axis direction, so as to keep the constant distance between the nozzle 24 and the applied surface on the workpiece 40 where the application liquid Lq is applied. As a result, even if there is a change in a discharge amount of the application liquid Lq from the nozzle 24 due to a change in temperature, remaining amount of the application liquid Lq and the pressure inside the syringe 23 of the dispenser head 20, the application thickness of the application liquid Lq on the workpiece 40 can be kept constant.

In addition, according to the present embodiment, even in the case where undulation occurs in the surface of the workpiece 40, since the first distance D1 from the distance measuring sensor 22a to the workpiece 40 can be measured by the distance measuring sensor 22a, even if the surface of the workpiece 40 as the application object is not flat but undulating, the application thickness d can be reliably measured accordingly. As a result, even if undulation occurs in the surface of the workpiece 40, the application thickness of the application liquid Lq on the workpiece 40 can be kept constant.

In addition, in the present embodiment, since two sensors, namely, the distance measuring sensor 22a and the application thickness measuring sensor 22b, are used, even if an expensive sensor such as a laser sensor is not used, it becomes possible to perform control to keep a constant application thickness. Accordingly, according to the present embodiment, the cost can be reduced.

In the above embodiment, an example of adjusting the distance between the dispenser head 20 and the workpiece 40 is explained as an adjustment method of the supply amount of the liquid. However, the present disclosure is not intended to be limited to such an embodiment. For example, a throttle element may be provided on the nozzle 24, so as to adjust the supply amount of the liquid by driving the throttle element.

In the above robot system, the liquid is applied by the liquid application part provided on the robot, and the application thickness of the liquid is measured by the application thickness measurement part. The distance measurement part measures the first distance from the distance measurement part to the application object. The control part controls the robot based on the first distance so that the second distance from the liquid application part to the application object becomes constant. The supply amount adjustment part adjusts the supply amount of the liquid to the application object according to the application thickness measured by the application thickness measurement part.

In the robot system as described above, the distance measurement part, the liquid application part and the application thickness measurement part are arranged in this order in the application direction of the liquid.

Accordingly, according to the above robot system, since the supply amount of the liquid is linearly controlled in real time according to the application thickness of the liquid while the application thickness is measured using the distance measurement part and the application thickness measurement part, even if there is a change in the conditions such as ambient temperature and so on, the liquid can be applied with a uniform layer thickness.

In addition, according to the above robot system, since the distance measurement part, the liquid application part and the application thickness measurement part are arranged in this order in the application direction of the liquid, it is possible to measure the application thickness by a time difference calculation.

In the robot system of an embodiment, when the liquid application part arrives at a point on the application object where the first distance is measured by the distance measurement part, the control part controls the robot based on the first distance so that the second distance from the liquid application part to the application object becomes constant, and when the application thickness measurement part arrives at the point on the application object where the first distance is measured by the distance measurement part, the application thickness measurement part measures the application thickness of the liquid based on a distance from the application thickness measurement part to an applied surface and the first distance.

In the robot system of the embodiment, by the distance measurement part, the liquid application part and the application thickness measurement part arranged in the above order, it is possible to measure the application thickness and adjust the supply amount of the liquid by a time difference calculation.

In the robot system of an embodiment, the liquid application part includes a syringe and a nozzle, wherein the nozzle includes a throttle element of a discharge port of the liquid, and the supply amount adjustment part adjusts the supply amount of the liquid to the application object by driving the throttle element.

In the robot system of the embodiment, the supply amount of the liquid is adjusted by driving the throttle element of the nozzle. The application thickness of the supplied liquid is measured as described above, and the distance between the liquid application part and the application object is linearly controlled in real time according to the application thickness. Accordingly, even if there is a change in the conditions such as ambient temperature and so on, the liquid can be applied with a uniform layer thickness.

In the robot system of an embodiment, the liquid application part includes a syringe and a nozzle, wherein a discharge of the liquid is suppressed by creating negative pressure inside the syringe, and the discharge of the liquid is performed by creating atmospheric pressure or positive pressure inside the syringe, and the supply amount adjustment part adjusts the supply amount of the liquid to the application object by adjusting a distance between the nozzle and the application object.

In the robot system of the embodiment, in the case where the pressure inside the syringe is changed to positive pressure, a discharge amount of the liquid varies depending on the distance between the nozzle and the application object. The application thickness of the discharged liquid is measured, and the distance between the liquid application part and the application object is linearly controlled in real time according to the application thickness. Accordingly, even if there is a change in the conditions such as ambient temperature and so on, the liquid can be applied with a uniform layer thickness.

According to the control method of the disclosure, since the supply amount of the liquid is linearly controlled in real time according to the application thickness of the liquid while the application thickness is measured using a distance measurement part and the application thickness measurement part, even if there is a change in the conditions such as ambient temperature and so on, the liquid can be applied with a uniform layer thickness.

In addition, according to the above control method, since the processing is performed in the order of the step of measuring the distance to the application object, the step of applying the liquid by the liquid application part and the step of measuring the application thickness, it is possible to measure the application thickness by a time difference calculation.

As clear from the above, according to the robot system and the control method of a robot of the disclosure, even if there is a change in the conditions such as ambient temperature and so on, the liquid can be applied with a uniform layer thickness.

The above embodiments are exemplary, and various modifications are possible without departing from the scope of the disclosure. The embodiments described above may each be established independently, but may also be combined with each other. Also, various features in different embodiments may also each be established independently, but combinations of the features in the different embodiments are also possible.

What is claimed is:

1. A robot system comprising:
   a robot;
   a liquid application part provided on the robot;
   an application thickness measurement part measuring an application thickness of a liquid applied by the liquid application part; and
   a distance measurement part measuring a first distance from the distance measurement part to an application object;
   a control part controlling the robot based on the first distance so that a second distance from the liquid application part to the application object becomes constant; and
   a supply amount adjustment part adjusting a supply amount of the liquid to the application object according to the application thickness measured by the application thickness measurement part, wherein the distance measurement part, the liquid application part and the application thickness measurement part are arranged in this order in an application direction of the liquid, wherein the liquid application part comprises a syringe and a nozzle, wherein a discharge of the liquid is suppressed by creating negative pressure inside the syringe, and the discharge of the liquid is performed by creating atmospheric pressure or positive pressure inside the syringe, and the supply amount adjustment part adjusts the supply amount of the liquid to the application object by adjusting a distance between the nozzle and the application object.

2. The robot system according to claim 1, wherein, when the liquid application part arrives at a point on the application object where the first distance is measured by the distance measurement part, the control part controls the robot based on the first distance so that the second distance from the liquid application part to the application object becomes constant, and when the application thickness measurement part arrives at the point on the application object where the first distance is measured by the distance measurement part, the application thickness measurement part measures the application thickness of the liquid based on a distance from the application thickness measurement part to an applied surface and the first distance.

3. The robot system according to claim 2, wherein the nozzle comprises a throttle element of a discharge port of the liquid.

4. The robot system according to claim 1, wherein the nozzle comprises a throttle element of a discharge port of the liquid.

5. A control method of a robot system wherein the robot system comprises a robot, a liquid application part provided on the robot, an application thickness measurement part, a distance measurement part, a control part and a supply amount adjustment part, wherein the distance measurement part, the liquid application part and the application thickness measurement part are arranged in this order in an application direction of a liquid, wherein the liquid application part comprises a syringe and a nozzle, wherein a discharge of the liquid is suppressed by creating negative pressure inside the syringe, and the discharge of the liquid is performed by creating atmospheric pressure or positive pressure inside the syringe, wherein the control method of the robot system comprises following steps:

measuring, by the application thickness measurement part, an application thickness of the liquid applied by the liquid application part provided on the robot;

measuring, by the distance measurement part, a first distance from the distance measurement part to an application object;

controlling, by the control part, the robot based on the first distance so that a second distance from the liquid application part to the application object becomes constant; and adjusting, by the supply amount adjustment part, a supply amount of the liquid to the application object according to the measured application thickness, wherein processing is performed in an order of the step of measuring the distance to the application object, the step of applying the liquid by the liquid application part and the step of measuring the application thickness;

the control method of the robot system further comprises:

adjusting, by the supply amount adjustment part, the supply amount of the liquid to the application object by adjusting a distance between the nozzle and the application object.

* * * * *